(12) United States Patent
Peart et al.

(10) Patent No.: US 7,542,942 B2
(45) Date of Patent: Jun. 2, 2009

(54) SYSTEM AND METHOD FOR SECURING SENSITIVE INFORMATION DURING COMPLETION OF A TRANSACTION

(75) Inventors: Lee J. Peart, Epsom (GB); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 1025 days.

(21) Appl. No.: 10/708,569

(22) Filed: Mar. 11, 2004

(65) Prior Publication Data

US 2005/0033686 A1 Feb. 10, 2005

Related U.S. Application Data

(63) Continuation-in-part of application No. 10/340,352, filed on Jan. 10, 2003, and a continuation-in-part of application No. 10/192,488, filed on Jul. 9, 2002, now Pat. No. 7,239,226.

(60) Provisional application No. 60/507,803, filed on Sep. 30, 2003, provisional application No. 60/396,577, filed on Jul. 16, 2002, provisional application No. 60/304,216, filed on Jul. 10, 2001.

(51) Int. Cl.
*G06Q 40/00* (2006.01)
(52) U.S. Cl. .......................................................... 705/39
(58) Field of Classification Search ........................ None
See application file for complete search history.

(56) References Cited

U.S. PATENT DOCUMENTS

| | | |
|---|---|---|
| 4,303,904 A | 12/1981 | Chasek |
| 4,443,027 A | 4/1984 | McNeely et al. |
| 4,450,535 A | 5/1984 | de Pommery et al. |

(Continued)

FOREIGN PATENT DOCUMENTS

CH 689070 A5 8/1988

(Continued)

OTHER PUBLICATIONS

U.S. Appl. No. 60/395,606, filed Jul. 15, 2002.*

(Continued)

*Primary Examiner*—Hani Kazimi
*Assistant Examiner*—Olabode Akintola
(74) *Attorney, Agent, or Firm*—Fitzpatrick, Cella, Harper & Scinto

(57) ABSTRACT

A system and method for securing a Radio Frequency (RF) transaction using a proxy code, which is permanently assigned to the RF identification device (RFID) transaction account number. An account issuer permanently assigns the proxy code to a transaction account correlated to the RFID transaction device. The proxy code is uploaded onto the transaction device for later use in completing a transaction request. During transaction completion, the proxy code is provided to a merchant system in lieu of any sensitive transaction account information. Since the proxy code is permanently assigned, the number need not be changed or updated once uploaded into a payment device or merchant system. Since the proxy code contains no sensitive information, the sensitive information related to the transaction account is secured from theft where the merchant system internal security measures may fail.

12 Claims, 2 Drawing Sheets

U.S. PATENT DOCUMENTS

| | | |
|---|---|---|
| 4,475,308 A | 10/1984 | Heise et al. |
| 4,583,766 A | 4/1986 | Wessel |
| 4,639,765 A | 1/1987 | d'Hont |
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A | 9/1989 | Tamaoki |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | Ing-Simmons et al. |
| 5,247,304 A | 9/1993 | d'Hont |
| 5,274,392 A | 12/1993 | d'Hont et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody |
| 5,351,052 A | 9/1994 | d'Hont et al. |
| 5,365,551 A | 11/1994 | Snodgrass et al. |
| 5,371,896 A | 12/1994 | Gove et al. |
| 5,373,303 A | 12/1994 | d'Hont |
| 5,397,881 A | 3/1995 | Mannik |
| 5,407,893 A | 4/1995 | Koshizuka et al. |
| 5,408,243 A | 4/1995 | d'Hont |
| 5,410,649 A | 4/1995 | Gove |
| 5,428,363 A | 6/1995 | d'Hont |
| 5,453,601 A | 9/1995 | Rosen |
| 5,453,747 A | 9/1995 | d'Hont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | d'Hont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | d'Hont |
| 5,500,513 A | 3/1996 | Langhans et al. |
| 5,500,651 A | 3/1996 | Schuermann |
| 5,504,808 A | 4/1996 | Hamrick |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | d'Hont |
| 5,557,516 A | 9/1996 | Hogan |
| 5,561,430 A | 10/1996 | Knebelkamp |
| 5,563,582 A | 10/1996 | d'Hont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | d'Hont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | d'Hont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | d'Hont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | d'Hont |
| 5,625,370 A | 4/1997 | d'Hont |
| 5,625,695 A | 4/1997 | M'Raihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,689,100 A | 11/1997 | Carrithers |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | d'Hont et al. |
| 5,734,838 A | 3/1998 | Robinson et al. |
| 5,742,756 A | 4/1998 | Dillaway et al. |
| 5,742,845 A | 4/1998 | Wagner |
| 5,748,137 A | 5/1998 | d'Hont |
| 5,748,737 A | 5/1998 | Daggar |

| | | | | | |
|---|---|---|---|---|---|
| 5,758,195 A | 5/1998 | Balmer | 5,917,168 A | 6/1999 | Nakamura et al. |
| 5,761,306 A | 6/1998 | Lewis | 5,918,216 A | 6/1999 | Miksovsky et al. |
| 5,761,493 A | 6/1998 | Blakeley et al. | 5,920,628 A | 7/1999 | Indeck et al. |
| 5,768,385 A | 6/1998 | Simon | 5,923,734 A | 7/1999 | Taskett |
| 5,768,609 A | 6/1998 | Gove et al. | 5,929,801 A | 7/1999 | Aslanidis et al. |
| 5,770,843 A | 6/1998 | Rose | 5,930,767 A | 7/1999 | Reber et al. |
| 5,774,882 A | 6/1998 | Keen et al. | 5,930,777 A | 7/1999 | Barber |
| 5,777,903 A | 7/1998 | Piosenka | 5,931,917 A | 8/1999 | Nguyen et al. |
| 5,778,067 A | 7/1998 | Jones et al. | 5,933,624 A | 8/1999 | Balmer |
| 5,778,069 A | 7/1998 | Thomlinson | 5,943,624 A | 8/1999 | Fox et al. |
| 5,785,680 A | 7/1998 | Niezink et al. | 5,948,116 A | 9/1999 | Aslanidis et al. |
| 5,792,337 A | 8/1998 | Padovani et al. | 5,949,044 A | 9/1999 | Walker et al. |
| 5,793,324 A | 8/1998 | Aslanidis et al. | 5,949,876 A | 9/1999 | Ginter et al. |
| 5,794,095 A | 8/1998 | Thompson | 5,953,512 A | 9/1999 | Cai et al. |
| 5,797,060 A | 8/1998 | Thompson | 5,953,710 A | 9/1999 | Fleming |
| 5,797,085 A | 8/1998 | Buek et al. | 5,955,717 A | 9/1999 | Vanstone |
| 5,797,133 A | 8/1998 | Jones et al. | 5,955,969 A | 9/1999 | d'Hont |
| 5,798,709 A | 8/1998 | Flaxl | 5,956,024 A | 9/1999 | Strickland et al. |
| 5,809,142 A | 9/1998 | Hurta et al. | 5,956,699 A | 9/1999 | Wong et al. |
| 5,809,288 A | 9/1998 | Balmer | 5,958,004 A | 9/1999 | Helland et al. |
| 5,809,633 A | 9/1998 | Mundigl et al. | 5,960,411 A | 9/1999 | Hartman et al. |
| 5,825,007 A | 10/1998 | Jesadanont | 5,963,915 A | 10/1999 | Kirsch |
| 5,825,302 A | 10/1998 | Stafford | 5,963,924 A | 10/1999 | Williams et al. |
| 5,826,077 A | 10/1998 | Blakeley et al. | 5,966,697 A | 10/1999 | Fergerson et al. |
| 5,826,241 A | 10/1998 | Stein | 5,970,148 A | 10/1999 | Meier |
| 5,826,242 A | 10/1998 | Montulli | 5,970,471 A | 10/1999 | Hill |
| 5,826,243 A | 10/1998 | Musmanno et al. | 5,970,472 A | 10/1999 | Allsop et al. |
| 5,828,044 A | 10/1998 | Jun et al. | 5,970,473 A | 10/1999 | Gerszberg et al. |
| 5,832,090 A * | 11/1998 | Raspotnik .................... 705/66 | 5,970,475 A | 10/1999 | Barnes et al. |
| 5,834,756 A | 11/1998 | Gutman et al. | RE36,365 E | 11/1999 | Levine et al. |
| 5,835,894 A | 11/1998 | Adcock et al. | 5,978,840 A | 11/1999 | Nguyen et al. |
| 5,841,364 A | 11/1998 | Hagl et al. | 5,979,757 A | 11/1999 | Tracy et al. |
| 5,842,088 A | 11/1998 | Thompson | 5,982,293 A | 11/1999 | Everett et al. |
| 5,844,218 A | 12/1998 | Kawan et al. | 5,983,207 A | 11/1999 | Turk et al. |
| 5,844,230 A | 12/1998 | Lalonde | 5,983,208 A | 11/1999 | Haller |
| 5,845,267 A | 12/1998 | Ronen | 5,984,180 A | 11/1999 | Albrecht |
| 5,851,149 A | 12/1998 | Xidos et al. | 5,987,140 A | 11/1999 | Rowney et al. |
| 5,852,812 A | 12/1998 | Reeder | 5,987,155 A | 11/1999 | Dunn et al. |
| 5,854,891 A | 12/1998 | Postlewaite et al. | 5,987,498 A | 11/1999 | Athing et al. |
| 5,858,006 A | 1/1999 | Van der AA et al. | 5,989,950 A | 11/1999 | Wu |
| 5,859,419 A | 1/1999 | Wynn | 5,991,413 A | 11/1999 | Arditti et al. |
| 5,859,779 A | 1/1999 | Giordano et al. | 5,991,608 A | 11/1999 | Leyten |
| 5,862,325 A | 1/1999 | Reed et al. | 5,991,748 A | 11/1999 | Taskett |
| 5,864,306 A | 1/1999 | Dwyer et al. | 5,991,750 A | 11/1999 | Watson |
| 5,864,323 A | 1/1999 | Berthon | 5,996,076 A | 11/1999 | Rowney et al. |
| 5,864,830 A | 1/1999 | Armetta et al. | 5,999,914 A | 12/1999 | Blinn et al. |
| 5,867,100 A | 2/1999 | d'Hont | 6,000,832 A | 12/1999 | Franklin et al. |
| 5,870,031 A | 2/1999 | Kaiser et al. | 6,002,438 A | 12/1999 | Hocevar et al. |
| 5,870,915 A | 2/1999 | d'Hont | 6,002,767 A | 12/1999 | Kramer |
| 5,878,138 A | 3/1999 | Yacobi | 6,003,014 A | 12/1999 | Lee et al. |
| 5,878,141 A | 3/1999 | Daly et al. | 6,005,942 A | 12/1999 | Chan et al. |
| 5,878,215 A | 3/1999 | Kling et al. | 6,006,216 A | 12/1999 | Griffin et al. |
| 5,878,337 A | 3/1999 | Joao et al. | 6,009,412 A | 12/1999 | Storey |
| 5,878,403 A | 3/1999 | DeFrancesco et al. | 6,011,487 A | 1/2000 | Plocher |
| 5,880,675 A | 3/1999 | Trautner | 6,012,039 A | 1/2000 | Hoffman et al. |
| 5,881,272 A | 3/1999 | Balmer | 6,012,049 A | 1/2000 | Kawan |
| 5,883,810 A | 3/1999 | Franklin et al. | 6,012,143 A | 1/2000 | Tanaka |
| 5,884,280 A | 3/1999 | Yoshioka et al. | 6,012,636 A | 1/2000 | Smith |
| 5,887,266 A | 3/1999 | Heinonen et al. | 6,014,634 A | 1/2000 | Scroggie et al. |
| 5,890,137 A | 3/1999 | Koreeda | 6,014,635 A | 1/2000 | Harris et al. |
| 5,897,622 A | 4/1999 | Blinn et al. | 6,014,636 A | 1/2000 | Reeder |
| 5,898,783 A | 4/1999 | Rohrbach | 6,014,645 A | 1/2000 | Cunningham |
| 5,898,838 A | 4/1999 | Wagner | 6,014,646 A | 1/2000 | Vallee et al. |
| 5,903,830 A | 5/1999 | Joao et al. | 6,014,648 A | 1/2000 | Brennan |
| 5,903,875 A | 5/1999 | Kohara | 6,014,650 A | 1/2000 | Zampese |
| 5,903,880 A | 5/1999 | Biffar | 6,014,748 A | 1/2000 | Tushi et al. |
| 5,905,798 A | 5/1999 | Nerlikar et al. | 6,016,482 A | 1/2000 | Molinari et al. |
| 5,905,908 A | 5/1999 | Wagner | 6,016,484 A | 1/2000 | Williams et al. |
| 5,909,492 A | 6/1999 | Payne et al. | 6,018,717 A | 1/2000 | Lee et al. |
| 5,912,678 A | 6/1999 | Saxena et al. | 6,018,718 A | 1/2000 | Walker et al. |
| 5,913,203 A | 6/1999 | Wong et al. | 6,021,943 A | 2/2000 | Chastain |
| 5,914,472 A | 6/1999 | Foladare et al. | 6,023,510 A | 2/2000 | Epstein |
| 5,915,023 A | 6/1999 | Bernstein | 6,024,286 A | 2/2000 | Bradley et al. |

| Patent No. | Kind | Date | Inventor |
|---|---|---|---|
| 6,029,147 | A | 2/2000 | Horadan et al. |
| 6,029,149 | A | 2/2000 | Dykstra et al. |
| 6,029,150 | A | 2/2000 | Kravitz |
| 6,029,890 | A | 2/2000 | Austin |
| 6,029,892 | A | 2/2000 | Miyake |
| 6,032,136 | A | 2/2000 | Brake et al. |
| 6,038,292 | A | 3/2000 | Thomas |
| 6,038,551 | A | 3/2000 | Barlow et al. |
| 6,038,584 | A | 3/2000 | Balmer |
| 6,041,308 | A | 3/2000 | Walker et al. |
| 6,044,360 | A | 3/2000 | Picciallo |
| 6,047,888 | A | 4/2000 | Dethloff |
| 6,052,675 | A | 4/2000 | Checchio |
| 6,058,418 | A | 5/2000 | Kobata |
| 6,061,344 | A | 5/2000 | Wood, Jr. |
| 6,061,789 | A | 5/2000 | Hauser et al. |
| 6,064,320 | A | 5/2000 | d'Hont et al. |
| 6,064,981 | A | 5/2000 | Barni et al. |
| 6,070,003 | A | 5/2000 | Gove et al. |
| 6,070,150 | A | 5/2000 | Remington et al. |
| 6,070,154 | A | 5/2000 | Tavor et al. |
| 6,072,870 | A | 6/2000 | Nguyen et al. |
| 6,073,840 | A | 6/2000 | Marion |
| 6,076,078 | A | 6/2000 | Camp et al. |
| 6,078,888 | A * | 6/2000 | Johnson, Jr. .................. 705/1 |
| 6,078,906 | A | 6/2000 | Huberman |
| 6,078,908 | A | 6/2000 | Schmitz |
| 6,081,790 | A | 6/2000 | Rosen |
| RE36,788 | E | 7/2000 | Mansvelt et al. |
| 6,088,683 | A | 7/2000 | Jalili |
| 6,088,686 | A | 7/2000 | Walker et al. |
| 6,088,717 | A | 7/2000 | Reed et al. |
| 6,088,797 | A | 7/2000 | Rosen |
| 6,092,057 | A | 7/2000 | Zimmerman et al. |
| 6,092,198 | A | 7/2000 | Lanzy et al. |
| 6,098,053 | A | 8/2000 | Slater |
| 6,098,879 | A | 8/2000 | Terranova |
| 6,101,174 | A | 8/2000 | Langston |
| 6,102,162 | A | 8/2000 | Teicher |
| 6,102,672 | A | 8/2000 | Woollenweber |
| 6,105,008 | A | 8/2000 | Davis et al. |
| 6,105,013 | A | 8/2000 | Curry et al. |
| 6,105,865 | A | 8/2000 | Hardesty |
| 6,108,641 | A | 8/2000 | Kenna et al. |
| 6,109,525 | A | 8/2000 | Blomqvist et al. |
| 6,112,152 | A | 8/2000 | Tuttle |
| 6,112,191 | A | 8/2000 | Burke |
| 6,115,360 | A | 9/2000 | Quay et al. |
| 6,115,458 | A | 9/2000 | Taskett |
| 6,116,423 | A | 9/2000 | Troxtell, Jr. et al. |
| 6,116,505 | A | 9/2000 | Withrow |
| 6,118,189 | A | 9/2000 | Flaxl |
| 6,121,544 | A | 9/2000 | Petsinger |
| 6,122,625 | A | 9/2000 | Rosen |
| 6,123,223 | A | 9/2000 | Watkins |
| 6,125,352 | A | 9/2000 | Franklin et al. |
| 6,129,274 | A | 10/2000 | Suzuki |
| 6,133,834 | A | 10/2000 | Eberth et al. |
| 6,141,651 | A | 10/2000 | Riley et al. |
| 6,141,752 | A | 10/2000 | Dancs et al. |
| 6,163,771 | A | 12/2000 | Walker et al. |
| 6,167,236 | A | 12/2000 | Kaiser et al. |
| 6,173,269 | B1 | 1/2001 | Sokol et al. |
| 6,173,272 | B1 | 1/2001 | Thomas et al. |
| 6,177,860 | B1 | 1/2001 | Cromer et al. |
| 6,179,205 | B1 | 1/2001 | Sloan |
| 6,179,206 | B1 | 1/2001 | Matsumori |
| 6,188,994 | B1 | 2/2001 | Egendorf |
| 6,189,787 | B1 | 2/2001 | Dorf |
| 6,192,255 | B1 | 2/2001 | Lewis et al. |
| 6,198,728 | B1 | 3/2001 | Hulyalkar et al. |
| 6,198,875 | B1 | 3/2001 | Edenson et al. |
| 6,202,927 | B1 | 3/2001 | Bashan et al. |
| 6,205,151 | B1 | 3/2001 | Quay et al. |
| 6,206,293 | B1 | 3/2001 | Gutman et al. |
| 6,213,390 | B1 | 4/2001 | Oneda |
| 6,215,437 | B1 | 4/2001 | Schurmann et al. |
| 6,216,219 | B1 | 4/2001 | Cai et al. |
| 6,219,439 | B1 | 4/2001 | Burger |
| 6,220,510 | B1 | 4/2001 | Everett et al. |
| 6,222,914 | B1 | 4/2001 | McMullin |
| D442,627 | S | 5/2001 | Webb et al. |
| D442,629 | S | 5/2001 | Webb et al. |
| 6,223,984 | B1 | 5/2001 | Renner et al. |
| 6,226,382 | B1 | 5/2001 | M'Raihi et al. |
| 6,227,447 | B1 | 5/2001 | Campisano |
| 6,230,270 | B1 | 5/2001 | Laczko, Sr. |
| 6,232,917 | B1 | 5/2001 | Baumer et al. |
| 6,233,683 | B1 | 5/2001 | Chan et al. |
| 6,237,848 | B1 | 5/2001 | Everett |
| 6,239,675 | B1 | 5/2001 | Flaxl |
| 6,240,187 | B1 | 5/2001 | Lewis |
| 6,248,199 | B1 | 6/2001 | Smulson |
| 6,257,486 | B1 | 7/2001 | Teicher et al. |
| 6,259,769 | B1 | 7/2001 | Page |
| 6,260,026 | B1 | 7/2001 | Tomida et al. |
| 6,260,088 | B1 | 7/2001 | Gove et al. |
| 6,263,316 | B1 | 7/2001 | Khan et al. |
| 6,264,106 | B1 | 7/2001 | Bridgelall |
| 6,266,754 | B1 | 7/2001 | Laczko, Sr. et al. |
| 6,267,292 | B1 | 7/2001 | Walker et al. |
| 6,269,348 | B1 | 7/2001 | Pare et al. |
| 6,273,335 | B1 | 8/2001 | Sloan |
| 6,282,522 | B1 | 8/2001 | Davis et al. |
| D447,515 | S | 9/2001 | Faenza, Jr. et al. |
| 6,286,763 | B1 | 9/2001 | Reynolds et al. |
| 6,289,324 | B1 | 9/2001 | Kawan |
| 6,293,462 | B1 | 9/2001 | Gangi |
| 6,315,193 | B1 | 11/2001 | Hogan |
| 6,315,195 | B1 | 11/2001 | Ramachandran |
| 6,317,721 | B1 | 11/2001 | Hurta et al. |
| 6,318,636 | B1 | 11/2001 | Reynolds et al. |
| 6,323,566 | B1 | 11/2001 | Meier |
| 6,325,285 | B1 | 12/2001 | Baratelli |
| 6,325,293 | B1 | 12/2001 | Moreno |
| 6,326,934 | B1 | 12/2001 | Kinzie |
| 6,327,573 | B1 | 12/2001 | Walker et al. |
| 6,330,544 | B1 | 12/2001 | Walker et al. |
| 6,336,095 | B1 | 1/2002 | Rosen |
| 6,342,844 | B1 | 1/2002 | Rozin |
| 6,353,811 | B1 | 3/2002 | Weissman |
| 6,364,208 | B1 | 4/2002 | Stanford et al. |
| 6,367,011 | B1 | 4/2002 | Lee et al. |
| 6,374,245 | B1 | 4/2002 | Park |
| 6,377,034 | B1 | 4/2002 | Ivanov |
| 6,378,073 | B1 | 4/2002 | Davis et al. |
| 6,388,533 | B2 | 5/2002 | Swoboda |
| 6,390,375 | B2 | 5/2002 | Kayanakis |
| 6,400,272 | B1 | 6/2002 | Holtzman et al. |
| 6,402,026 | B1 | 6/2002 | Schwier |
| 6,402,028 | B1 | 6/2002 | Graham, Jr. et al. |
| 6,411,611 | B1 | 6/2002 | Van der Tuijn |
| 6,415,978 | B1 | 7/2002 | McAllister |
| 6,422,464 | B1 | 7/2002 | Terranova |
| 6,424,029 | B1 | 7/2002 | Giesler |
| 6,427,910 | B1 | 8/2002 | Barnes et al. |
| 6,438,235 | B2 | 8/2002 | Sims, III |
| 6,439,455 | B1 | 8/2002 | Everett et al. |
| 6,442,532 | B1 | 8/2002 | Kawan |
| 6,445,794 | B1 | 9/2002 | Shefi |
| 6,457,996 | B1 | 10/2002 | Shih |
| 6,466,804 | B1 | 10/2002 | Pecen et al. |
| 6,473,500 | B1 | 10/2002 | Risafi et al. |
| 6,480,100 | B1 | 11/2002 | Frieden et al. |
| 6,480,101 | B1 | 11/2002 | Kelly et al. |
| 6,481,621 | B1 | 11/2002 | Herrendoerfer et al. |

| | | | | | | |
|---|---|---|---|---|---|---|
| 6,481,632 B2 | 11/2002 | Wentker et al. | | 2001/0034720 A1 | 10/2001 | Armes |
| 6,483,427 B1 | 11/2002 | Werb | | 2001/0039617 A1 | 11/2001 | Buhrlen et al. |
| 6,483,477 B1 | 11/2002 | Plonka | | 2001/0049628 A1 | 12/2001 | Icho |
| 6,483,929 B1 | 11/2002 | Murakami | | 2002/0011519 A1 | 1/2002 | Shults |
| 6,484,937 B1 | 11/2002 | Devaux et al. | | 2002/0026419 A1 | 2/2002 | Maritzen et al. |
| 6,490,443 B1 | 12/2002 | Freeny, Jr. | | 2002/0028704 A1 | 3/2002 | Bloomfield et al. |
| 6,491,229 B1 | 12/2002 | Berney | | 2002/0035548 A1 | 3/2002 | Hogan et al. |
| 6,494,380 B2 | 12/2002 | Jarosz | | 2002/0046341 A1 | 4/2002 | Kazaks et al. |
| 6,507,762 B1 | 1/2003 | Amro et al. | | 2002/0052839 A1 | 5/2002 | Takatori |
| 6,510,983 B2 | 1/2003 | Horowitz et al. | | 2002/0062284 A1 | 5/2002 | Kawan |
| 6,510,998 B1 | 1/2003 | Stanford et al. | | 2002/0074398 A1 | 6/2002 | Lancos et al. |
| 6,513,015 B2 | 1/2003 | Ogasawara | | 2002/0077837 A1 | 6/2002 | Krueger et al. |
| 6,519,565 B1 | 2/2003 | Clements et al. | | 2002/0077895 A1 | 6/2002 | Howell |
| 6,520,542 B2 | 2/2003 | Thompson et al. | | 2002/0077992 A1 | 6/2002 | Tobin |
| 6,529,880 B1 | 3/2003 | McKeen et al. | | 2002/0079367 A1 | 6/2002 | Montani |
| 6,535,726 B1 | 3/2003 | Johnson | | 2002/0092914 A1 | 7/2002 | Pentz et al. |
| 6,546,373 B1 | 4/2003 | Cerra | | 2002/0095298 A1 | 7/2002 | Ewing |
| 6,547,133 B1 | 4/2003 | DeVries, Jr. et al. | | 2002/0095343 A1 | 7/2002 | Barton et al. |
| 6,549,912 B1 | 4/2003 | Chen | | 2002/0095389 A1 | 7/2002 | Gaines |
| 6,560,581 B1 | 5/2003 | Fox et al. | | 2002/0095587 A1 | 7/2002 | Doyle et al. |
| 6,577,229 B1 | 6/2003 | Bonneau et al. | | 2002/0097144 A1 | 7/2002 | Collins et al. |
| 6,578,768 B1 | 6/2003 | Binder et al. | | 2002/0107007 A1 | 8/2002 | Gerson |
| 6,581,839 B1 | 6/2003 | Lasch et al. | | 2002/0107742 A1 | 8/2002 | Magill |
| 6,587,835 B1 | 7/2003 | Treyz et al. | | 2002/0109580 A1 | 8/2002 | Shreve et al. |
| 6,588,660 B1 | 7/2003 | Buescher et al. | | 2002/0111210 A1 | 8/2002 | Luciano, Jr. et al. |
| 6,589,119 B1 | 7/2003 | Orus et al. | | 2002/0111917 A1 | 8/2002 | Hoffman et al. |
| 6,598,024 B1 | 7/2003 | Walker et al. | | 2002/0113082 A1 | 8/2002 | Leatherman et al. |
| 6,608,995 B1 | 8/2003 | Kawasaki et al. | | 2002/0116274 A1 | 8/2002 | Hind et al. |
| 6,609,655 B1 | 8/2003 | Harrell | | 2002/0120584 A1 | 8/2002 | Hogan et al. |
| 6,623,039 B2 | 9/2003 | Thompson et al. | | 2002/0126010 A1 | 9/2002 | Trimble et al. |
| 6,626,356 B2 | 9/2003 | Davenport et al. | | 2002/0131567 A1 | 9/2002 | Maginas |
| 6,628,961 B1 | 9/2003 | Ho et al. | | 2002/0138438 A1 | 9/2002 | Bardwell |
| 6,636,833 B1 | 10/2003 | Flitcroft et al. | | 2002/0140542 A1 | 10/2002 | Prokoski et al. |
| 6,650,887 B2 | 11/2003 | McGregor et al. | | 2002/0145043 A1 | 10/2002 | Challa et al. |
| 6,662,166 B2 | 12/2003 | Pare et al. | | 2002/0147913 A1 | 10/2002 | Lun Yip |
| 6,665,405 B1 | 12/2003 | Lenstra | | 2002/0148892 A1 | 10/2002 | Bardwell |
| 6,669,086 B2 | 12/2003 | Abdi et al. | | 2002/0152123 A1 | 10/2002 | Giordano et al. |
| 6,671,358 B1 | 12/2003 | Seidman et al. | | 2002/0154795 A1 | 10/2002 | Lee et al. |
| 6,674,786 B1 | 1/2004 | Nakamura et al. | | 2002/0166891 A1 | 11/2002 | Stoutenburg et al. |
| 6,679,427 B1 | 1/2004 | Kuroiwa | | 2002/0174067 A1 | 11/2002 | Hoffman et al. |
| 6,681,328 B1 | 1/2004 | Harris et al. | | 2002/0176522 A1 | 11/2002 | Fan |
| 6,684,269 B2 | 1/2004 | Wagner | | 2002/0178063 A1 | 11/2002 | Gravelle et al. |
| 6,687,714 B1 | 2/2004 | Kogen et al. | | 2002/0178369 A1 | 11/2002 | Black |
| 6,690,930 B1 | 2/2004 | Dupre | | 2002/0185543 A1 | 12/2002 | Pentz et al. |
| 6,693,513 B2 | 2/2004 | Tuttle | | 2002/0188501 A1 | 12/2002 | Lefkowith |
| 6,705,530 B2 | 3/2004 | Kiekhaefer | | 2002/0190125 A1 | 12/2002 | Stockhammer |
| 6,711,262 B1 | 3/2004 | Watanen | | 2002/0194303 A1 | 12/2002 | Stuila et al. |
| 6,732,936 B1 | 5/2004 | Kiekhaefer | | 2002/0194503 A1 | 12/2002 | Faith et al. |
| 6,742,120 B1 | 5/2004 | Markakis et al. | | 2002/0196963 A1 | 12/2002 | Bardwell |
| 6,747,546 B1 | 6/2004 | Hikita et al. | | 2003/0009382 A1 | 1/2003 | D'Arbelott et al. |
| 6,760,581 B2 | 7/2004 | Dutta | | 2003/0014307 A1 | 1/2003 | Heng |
| 6,769,718 B1 | 8/2004 | Warther et al. | | 2003/0014357 A1 | 1/2003 | Chrisekos et al. |
| 6,771,981 B1 | 8/2004 | Zalewski et al. | | 2003/0014891 A1 | 1/2003 | Nelms et al. |
| 6,789,012 B1 | 9/2004 | Childs et al. | | 2003/0018532 A1 | 1/2003 | Dudek et al. |
| 6,834,270 B1 | 12/2004 | Pagani et al. | | 2003/0018567 A1 | 1/2003 | Flitcroft et al. |
| 6,851,617 B2 | 2/2005 | Saint et al. | | 2003/0025600 A1 | 2/2003 | Blanchard |
| 6,853,087 B2 | 2/2005 | Neuhaus et al. | | 2003/0028481 A1 | 2/2003 | Flitcroft et al. |
| 6,853,894 B1 | 2/2005 | Kolls | | 2003/0046228 A1 | 3/2003 | Berney |
| 6,853,987 B1 | 2/2005 | Cook | | 2003/0054836 A1 | 3/2003 | Michot |
| 6,857,566 B2 | 2/2005 | Wankmueller | | 2003/0055727 A1 | 3/2003 | Walker et al. |
| 6,859,672 B2 | 2/2005 | Roberts et al. | | 2003/0057226 A1 | 3/2003 | Long |
| 6,895,310 B1 | 5/2005 | Kolls | | 2003/0057278 A1 | 3/2003 | Wong |
| 6,994,262 B1 | 2/2006 | Warther | | 2003/0069828 A1 | 4/2003 | Blazey et al. |
| 7,003,501 B2 | 2/2006 | Ostroff | | 2003/0069846 A1 | 4/2003 | Marcon |
| 7,069,444 B2 | 6/2006 | Lowensohn et al. | | 2003/0112972 A1 | 6/2003 | Hattick et al. |
| 7,096,204 B1 | 8/2006 | Chen et al. | | 2003/0120554 A1 | 6/2003 | Hogan et al. |
| 7,100,821 B2 | 9/2006 | Rasti | | 2003/0121969 A1 | 7/2003 | Wankmueller |
| 7,103,575 B1 | 9/2006 | Linehan | | 2003/0130820 A1 | 7/2003 | Lane, III |
| 7,136,835 B1 | 11/2006 | Flitcroft et al. | | 2003/0132284 A1 | 7/2003 | Reynolds et al. |
| 7,213,748 B2 | 5/2007 | Tsuei et al. | | 2003/0140228 A1 | 7/2003 | Binder |
| 2001/0013542 A1 | 8/2001 | Horowitz et al. | | 2003/0163699 A1 | 8/2003 | Pailles et al. |
| 2001/0024157 A1 | 9/2001 | Hansmann et al. | | 2003/0167207 A1 | 9/2003 | Berardi et al. |
| 2001/0034565 A1 | 10/2001 | Leatherman | | 2003/0177347 A1 | 9/2003 | Schneier et al. |

| | | |
|---|---|---|
| 2003/0183689 A1 | 10/2003 | Swift et al. |
| 2003/0183699 A2 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195037 A1 | 10/2003 | Vuong et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0006539 A1 | 1/2004 | Royer et al. |
| 2004/0010462 A1* | 1/2004 | Moon et al. .............. 705/39 |
| 2004/0015451 A1 | 1/2004 | Sahota et al. |
| 2004/0020982 A1 | 2/2004 | Hoffman et al. |
| 2004/0029569 A1 | 2/2004 | Khan et al. |
| 2004/0030601 A1 | 2/2004 | Pond et al. |
| 2004/0039814 A1 | 2/2004 | Crabtree et al. |
| 2004/0039860 A1 | 2/2004 | Mills et al. |
| 2004/0044627 A1 | 3/2004 | Russell et al. |
| 2004/0083184 A1 | 4/2004 | Tsuei et al. |
| 2004/0139021 A1 | 7/2004 | Reed et al. |
| 2005/0017068 A1 | 1/2005 | Zalewski et al. |
| 2005/0038718 A1 | 2/2005 | Barnes et al. |
| 2005/0040272 A1 | 2/2005 | Argumedo et al. |
| 2005/0119978 A1 | 6/2005 | Ates |
| 2005/0121512 A1 | 6/2005 | Wankmueller |

FOREIGN PATENT DOCUMENTS

| | | |
|---|---|---|
| EP | 0 358 525 A2 | 3/1990 |
| EP | 0 424 726 A1 | 5/1991 |
| EP | 0 484 726 A1 | 5/1992 |
| EP | 0 933 717 A1 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 115 095 A2 | 7/2001 |
| EP | 1 199 684 A2 | 4/2002 |
| EP | 1 251 450 A1 | 10/2002 |
| GB | 2347537 | 9/2000 |
| GB | 2 361 790 A | 10/2001 |
| JP | 2000011109 A | 1/2000 |
| JP | 2000015288 A | 1/2000 |
| JP | 2000040181 A | 2/2000 |
| JP | 2000067312 A | 3/2000 |
| JP | 2000207641 A | 7/2000 |
| JP | 2001005931 A | 1/2001 |
| JP | 2001283122 A | 10/2001 |
| WO | 99/03057 A1 | 1/1991 |
| WO | WO 95/32919 | 12/1995 |
| WO | 97/09688 A3 | 3/1997 |
| WO | 99/49424 A1 | 9/1999 |
| WO | 00/10144 A1 | 2/2000 |
| WO | 00/38088 A1 | 6/2000 |
| WO | 00/49586 A1 | 8/2000 |
| WO | 01/04825 A1 | 1/2001 |
| WO | 01/15098 A1 | 3/2001 |
| WO | 01/43095 A2 | 6/2001 |
| WO | 01/72224 A1 | 10/2001 |
| WO | 01/77856 A1 | 10/2001 |
| WO | 01/80473 A2 | 10/2001 |
| WO | 01/86535 A1 | 11/2001 |
| WO | 01/90962 A1 | 11/2001 |
| WO | 01/95243 A2 | 12/2001 |
| WO | 02/01485 A1 | 1/2002 |
| WO | 02/13134 A2 | 2/2002 |
| WO | 02/21903 A1 | 3/2002 |
| WO | 02/063545 A2 | 8/2002 |
| WO | 02/065246 A3 | 8/2002 |
| WO | 02/065404 A2 | 8/2002 |
| WO | 02/069221 A1 | 9/2002 |
| WO | 02/073512 A1 | 9/2002 |
| WO | 02/086665 A2 | 10/2002 |
| WO | 02/091281 A2 | 11/2002 |
| WO | 02/097575 A2 | 12/2002 |
| WO | 02/101670 A2 | 12/2002 |
| WO | 03/007623 A3 | 1/2003 |

OTHER PUBLICATIONS

International Search Report and Written Opinion of the International Searching Authority, PCT/US05/26067, May 23, 2007.
"Credit Card Offer Travelers New Benefit", PR Newswire, Aug. 5, 1987.
"Fingerprint Analysis- The Basics", http://www.crimtrac.gov.au/fingerprintanalysis.htm, Feb. 18, 2004, 3 pages.
"Fingerprint Technology- Identix Inc.- Empowering Identification™- Understanding Biometrics", http://www.identix.com/newsroom/news_biometrics_finger.html, Feb. 18, 2004, 1 page.
"Identix Inc.—Empowering Identification™—Understanding Biometrics", http://www.identix.com/newsroom/news_biometrics_face.html, 1 page.
"Individual Biometric- Facial Recognition", http://ctl.ncsc.dni.us/biomet%20web/Bmfacial.html, Feb. 18, 2004, 2 pages.
"Individual Biometric- Fingerprint", http://ctl.ncsc.dni.us/biomet%20web/BMFingerprint.html, Feb. 18, 2004, 3 pages.
"Individual Biometric- Hand Geometry", http://ctl.ncsc.dni.us/biomet%20web/BMHand.html, Feb. 18, 2004, 2 pages.
"Individual Biometric- Iris Scan", http://ctl.ncsc.dni.us/biomet%20web/BMIris.html, Feb. 18, 2004, 2 pages.
"Individual Biometric- Retinal Scan", http://ctl.ncsc.dni.us/biomet%20web/BMRetinal.html, Feb. 18, 2004, 2 pages.
"Individual Biometric- Vascular Patterns", http://ctl.ncsc.dni.us/biomet%20web/BMVascular.html, Feb. 18, 2004, 1 page.
"International Biometric Group- Signature Biometrics: How it Works", http://www.ibgweb.com/reports/public/reports/signature-scan_tech.html, Feb. 18, 2004, 1 page.
"International Biometric Group- Voice Recognition Technology: How It Works", http://www.ibgweb.com/reports/public/reports/voice-scan_tech.html, Feb. 18, 2004, 1 page.
"ISO Magnetic Strip Card Standards", http://www.cyberd.co.uk/support/technotes/isocards.htm, Feb. 9, 2004, 4 pages.
"New Evidence about Positive Three-Tier Co-pay Performance Presented at Express Scripts 2000 Outcomes Conference", PR Newswire Association, Inc., Jun. 28, 2000.
"Pay by Touch- Press Releases", http://www.paybytouch.com/press/html, Feb. 10, 2004, 3 pages.
"Paying It By Ear", The Guardian http://money.guardian.co.uk/creditanddebt/creditcards/story/0,1456,876908,00.html, Jan. 18, 2003, 3 pages.
"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.
"Prestige Credit Cards: Those Pricey Plastics", Changing Times, Apr. 1986.
"Shell Introduces Optional Credit Card", The Associated Press, Sep. 3, 1985.
"Shell Introducing Expanded 'Signature' Credit Card", Tulsa Business Chronicle, Sep. 5, 1985.
"Shell-Oil: Introduces Shell Signature Travel and Entertainment Credit Card", Business Wire, Sep. 3, 1985.
"Smart Card Developer's Kit: Some Basic Standards for Smart Card", http://unix.be.eu.org/docs/smart-card-developer-kit/ch03/033-035.html, Feb. 9, 2004, 2 pages.

"The Chase Manhattan Bank Today Announced a Comprehensive Program to Enhance the Value of All its Credit Cards", PR Newswire, Dec. 18, 1986.

"The Henry Classification System", International Biometric Group, 7 pages.

American Express to offer disposable credit card numbers, CNN.com. U.S. News, www.cnn.com/2000/US/09/08/online.payments.ap/, Sep. 8, 2000.

American Express, Private Payments SM: A New Level of Security from American Express, American Express Website, Cards.

Bonsor, "How Facial Recognition Systems Work", http://computer.howstuffworks.com/facial-recognition.htm/printable, Feb. 18, 2004, 6 pages.

Bowman, "Everything You Need to Know About Biometrics", Identix Corporation, Jan. 2008, 8 pages.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Disposable Credit Card Numbers, courtesy fo CardRatings.org, The Dollar Stretcher, www.stretcher.com/stories/01/010212e.cfm, Jan. 2001.

Docmemory, RFID Takes Priority With Wal-Mart, http://www.simmtester.com/page/news/shownews.asp?num=6650, Feb. 9, 2004, 2 pages.

Evers, "Judge Dismisses FTC Suite Against Rambus", IDG New Service, http://www.infoworld.com/article/04/02/18/HNjudgedismisses_1.html, Feb. 18, 2004, 3 pages.

Gabber, et al., "Agora: A Minimal Distributed Protocol for Electronic Commerce", USENIX Oakland, CA, Nov. 18, 1996.

Goldwasser, Joan, "Best of the Cash-back Cards", Kiplinger's Personal Finance Magazine, Apr. 1999.

Greene, Thomas C., American Express offers temporary CC numbers for the Web, The Register, www.theregister.com.uk/content/1/13132.html, Sep. 9, 2000.

Harris, "How Fingerprint Scanners Work", http://computer.howstuffworks.com/fingerprint-scanner.htm/printable, Feb. 18, 2004, 6 pages.

http://www.palowireless.com/infotooth/tutorial.asp, Apr. 28, 2003.

http://www.palowireless.com/infotooth/tutorial/12cap.asp, Apr. 28, 2003.

http://www.palowireless.com/infotooth/tutorial/baseband.asp, Apr. 28, 2003.

http://www.palowireless.com/infotooth/tutorial/hci.asp, Apr. 28, 2003.

http://www.palowireless.com/infotooth/tutorial/lmp.asp, Apr. 28, 2003.

http://www.palowireless.com/infotooth/tutorial/k1_gap.asp, Apr. 28, 2003.

http://www.palowireless.com/infotooth/tutorial/profiles.asp, Apr. 28, 2003.

http://www.palowireless.com/infotooth/tutorial/radio.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

http://www.palowireless.com/infotooth/whatis.asp, Apr. 28, 2003.

http://www.semiconductors.philips.com/news/content/file_878.html, Apr. 7, 2003.

Hurley et al., "Automatic Ear Recognition by Force Field Transformations", The Institution of Electrical Engineers, 2000, pp. 7/1-7/5.

International Search Report and Written Opinion of the International Searching Authority, PCT/US05/26101, May 13, 2008.

Korotkaya, "Biometric Person Authentication: Odor", Department of Information Technology, Laboratory of Applied Mathematics, Lappeenranta University of Technology, 18 pages.

Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.

Kulkarni, et al., "Biometrics: Speaker Verification" http://biometrics.cse.msu.edu/speaker.html, Mar. 8, 2004, 5 pages.

Kuntz, Mary, "Credit Cards as Good as Gold", Forbes, Nov. 4, 1985.

Lahey, Liam, "Microsoft Bolsters Rebate Structure", Computer Dealer News, Feb. 8, 2002.

Lamond, "Credit Card Transactions Real World and Online" © 1996.

Luettin, "Visual Speech and Speaker Recognition", http://herens.idiap.ch/~luettin/luettin-thesis.bib.abs.html, Jun. 30, 2000, 1 page.

Martin, Zack, One-Time Numbers Stop Web Hackers From Pilfering Data, Card Marketing, Thomson Financial, www.cardforum.com/html/cardmark/jan01_c3.html, Jan. 2001.

McPerson, "The Evolution of Mobile Payment", Financial Insights, http://www.banktech.com/story/news/showArticle.jhtml?articleID=17601432, Feb. 2, 2004, 2 pages.

Nyman, Judy, "Free Income Tax Clinics are Opening as Apr. 30 Deadline Draws Nearer", The Toronto Star, Final Edition, Mar. 25, 1986.

Obel, Michael, "Oil Companies Push Marketing, Cost Cutting to Fortify Earnings", Oil & Gas Journal, Sep. 16, 1985.

Pay By Touch—Company, http://www.paybytouch.com/company.html.

Roberti, "TI Embraces Prox Card Standard", http://www.ti.com/tiris/docs/news/in_the_news/2003/3-6-03.shtml, Mar. 6, 2003, 2 pages.

Rohde, "Microsoft, IBM and Phillips Test RFID Technology", IDG New Service, http://www.computerweekly.com/Article127889.htm, Feb. 9, 2004, 3 pages.

Ross et al., "Biometrics: Hand Geometry", http://biometrics.cse.msu.msu.edu/hand_geometry.html, Feb. 26, 2004, 2 pages.

Schmuckler, Eric, "Playing Your Cards Right", Forbes, Dec. 28, 1987.

Sony, Philips to Test RFID Platform, RFID Journal, May 8, 2003, 2 pages.

Wilson, "Putting Their Finger on It", http://sanfrancisco.bizjournals.com/sanfrancisco/stories/2003/10/20/story6.html?t=printable, Feb. 9, 2004, 2 pages.

"Core One Credit Union- Discover the Advantage", http://coreone.org/2visa.html, Copyright 2001, (Last Visited Oct. 9, 2002).

"What's New: Timex Watch Features Speedpass System", http://www.speedpass.com/news/article.jsp?id=51, 1 page.

Sharp, Ken, Senior Technical Editor, "Physical Reality: A Second Look", http://www.idsystems.com/reader/1999-03/phys0399_pt2/phys0399_pt2.htm.

Brewin, Bob, "Magic Wands' to Speed Mobile Sales", http://www.computerworld.com/mobiletopics/mobile/story/1,10801,563300.html, Jan. 15, 2001.

"Mobile Speedpass Goes Global as Mobil Singapore Rolls Out Asia's First RFID-Based Pay-At-The-Pump System", http://www.ti.com/tiris/docs/news_releases/rel12.htm, Apr. 5, 1999, Press Release.

"Speedpass Unleashed", http://www.cardweb.com/cardtrak/news/cf2_20a_97/html, Jun. 4, 2002, 2 pages.

Prophecy Central Update #9, http://www.bible.-prophecy.com/pcu9.htm, Oct. 10, 1997, 5 pages.

International Newsletter of the TI RFID Group, 2000, Issue 20, 12 pages.

Niccolai, James, "CES: Microsoft's SPOT Technology has Humble Origins", http://archive.inforworld.com/articles/hn/xml/03/01/10/030110hnspot.xml?s=IDGNS, Jan. 10, 2003, 3 pages.

Shim, Richard, "Microsoft: See SPOT Run On Your Wrist", http://news.com/2100-1041_3-1013442.html?tag=fd_top, Jun. 5, 2003, 1 page.

Kaplan, Jeremy A., "Networking: Microsoft SPOT", http://www.pcmag.com/print_article/0,3048,a=43561,00.asp, Jul. 1, 2003, 2 pages.

"Microsoft Launches Smart Personal Object Technology Initiative", Press Release from COMDEX Fall 2002, http://www.Microsoft.com/presspass/features/2002/nov02/11-17SPOT.asp, Nov. 17, 2002, 4 pages.

Bank Extends RFID Payment Pilot: Bank of America will continue to test its QuickWave RFID payment card for another three months, RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic-ticket network", RFID Journal, Aug. 21, 2002.

Security for Wireless Java: NTRU, a startup that offers security software, has released a Java version of its NTRU encryption algorithm, RFID Journal, Jun. 27, 2002.

"Making RFID Payments Ubiquitous: Philips and Visa want people to be able to pay for goods and services anywhere by using RFID chips embedded in phones and other devices", RFID Journal, Jun. 2, 2003.

RFID Smart Card Gain Ground: The convenience of contactless transactions is driving widespread adoption of contactless smart "cards", RFID Journal, Apr. 9, 2003.

"TI Embraces Prox Card Standard: Texas instrument's ISO 14443 payment platform promises faster data transfer rates and more security", RFID Journal, Mar. 6, 2003.

"Multiple Frequency Transponders: Volume production of dual-band FRID chips begins", Frontline Solutions, Jul. 19, 2003.

Functional Specification, Standard Card IC MF1 1C S 50, Philips Semiconductors, Product Specification Re. 5.1, May 2001.

* cited by examiner

SYSTEM AND METHOD FOR SECURING SENSITIVE INFORMATION DURING COMPLETION OF A TRANSACTION

CROSS REFERENCE TO RELATED APPLICATIONS

This invention is a continuation-in-part of, and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 now U.S. Pat. No. 7,239,226 (which itself claims priority to U.S. Provisional Patent Application No. 60/304,216, filed Jul. 10, 2001), and to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396, 577, filed Jul. 16, 2002), all of the foregoing applications are incorporated herein by reference. This invention also claims priority to U.S. Provisional Patent Application No. 60/507, 803, filed Sep. 30, 2003.

FIELD OF INVENTION

This invention generally relates to securing a transaction involving radio frequency identification (RFID) technology. More particularly, the invention pertains to a system and method for securing the RFID enabled transaction using a code or number which hides the underlying payment device information from the merchant system.

BACKGROUND OF INVENTION

Like barcode and voice data entry, RFID is a contactless information acquisition technology. RFID systems are wireless, and are usually extremely effective in hostile environments where conventional acquisition methods often fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical RFID fob is ordinarily a self-contained device, which may take the shape of any portable form factor. The RFID fob may include a transponder for transmitting information during a transaction. In some instances, a battery may be included in the fob to power the transponder, in which case the internal circuitry of the fob (including the transponder) may draw its operating power from the battery power source. Alternatively, the fob may gain its operating power directly from an RF interrogation signal. U.S. Pat. No. 5,053,774, issued to Schuermann, describes a typical transponder RF interrogation system which may be found in the prior art. The Schuermann patent generally describes the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob into an interrogation signal. In this regard, the fob may be activated irrespective of whether the user desires such activation. Alternatively, the fob may have an internal power source such that interrogation by the reader for activation of the fob is not required.

One of the more visible uses of the RFID technology is the introduction of Exxon/Mobil's Speedpass® and Shell's EasyPay® products. These products use transponders, placed in a fob or tag, which enable automatic identification of the user when the fob is presented at a merchant's Point of Sale (POS) device, for example, when attempting to complete a transaction. During the transaction completion, information from the RFID fob is ordinarily passed to the POS, which delivers the information to a merchant system.

To complete the transaction, fob identification data typically may be passed to a third-party server database. The third-party server may reference the identification data to a customer (e.g., user) credit or debit account. In an exemplary processing method, the third-party server may seek authorization for the transaction by passing the transaction and account data to an authorizing entity, such as for example an "acquirer" or account issuer. Once the server receives authorization from the authorizing entity, the authorizing entity sends clearance to the POS device for completion of the transaction.

In addition to sending the information to an issuer system for verification, the merchant system may store the information in a merchant system database for later reference. For example, where the transaction device user is a repeat customer, the transaction device user may wish to complete the transaction using transaction account information previously submitted to the merchant system. Since the account information is stored on the merchant system, the user need not provide the information to a merchant to complete subsequent transactions. Instead, the user may indicate to the merchant to use the transaction account information stored on the merchant system for transaction completion.

In another typical example, the merchant system may store the transaction account information for later reference when the transaction device user establishes a "recurring billing" account. In this instance, the merchant may periodically charge a user for services rendered or goods purchased. The user may authorize the merchant system to seek satisfaction of the bill using the transaction account information. The merchant may thereby send a transaction request regarding the bill to an account provider, or a third-party server.

To lessen the financial impact of fraudulent transactions in the RFID environment, fob issuers have focused much effort on securing RFID transactions. Many of the efforts have focused on securing the transaction account or related data during transmission from the user to the merchant, or from the merchant to third-party server or account provider system. For example, one conventional method for securing RFID transactions involves requiring the device user to provide a secondary form of identification during transaction completion. The RFID transaction device user may be asked to enter a personal identification number (PIN) into a keypad. The PIN may then be verified against a number associated with the user or the RFID transaction device, wherein the associated number is stored in an account issuer database. If the PIN number provided by the device user matches the associated number, then the transaction may be cleared for completion.

One problem with the issuer's efforts in securing RFID transactions is that they typically do not focus on the ways to guard the transaction account information stored on the merchant system from theft. As noted, the merchant may typically store on a merchant database the information received from the transaction device during a transaction. Such information may be sensitive information concerning the fob user or the fob user's account. Should the fob user's sensitive information be retrieved from the merchant system without authorization, the fob user or issuer may be subjected to fraudulent activity. The ability to secure the sensitive information stored on the merchant system is limited by the security measures taken by the merchant in securing its merchant system database. Consequently, the account provider often has little influence over the security of the account information once the information is provided to the merchant system.

As such, a need exists for a method of securing sensitive transaction account information which permits the account provider to have a significant influence on the security of the fob user information stored on a merchant system. A suitable system may secure the sensitive information irrespective of the merchant system.

SUMMARY OF INVENTION

A system and method for securing transactions is described which addresses the problems found in conventional transaction securing methods. The securing method described herein includes providing a proxy code to a merchant system during a transaction instead of providing sensitive transaction account information. A transaction device in accordance with the invention provides the proxy code to the merchant system contemporaneously with a transaction request. The merchant system may receive the proxy code and correlate the proxy code to a user or transaction in the merchant system. The merchant system may store the proxy code in a merchant database for later reference.

The proxy code does not include any sensitive information about the transaction device user or user transaction account. Instead the merchant system receives a proxy code, which takes the place of that sensitive information ordinarily received during transaction completion. In other words, certain information such as the user's actual account number is never transmitted to the merchant. Thus, the user's account number is not available should the merchant system be compromised.

In accordance with one exemplary embodiment of the invention, a radio frequency identification (RFID) transaction device is used to complete a transaction. The RFID transaction device may be interrogated by a RFID reader operable to provide a RF interrogation signal for powering a transponder system. The RFID reader may receive the proxy code instead of sensitive transaction device information, and the merchant may receive the transaction device proxy code from the RFID transaction device and provide the proxy code to an authorizing agent, such as an acquirer or an account issuer, for verification. For example, the authorizing agent may verify that the proxy code corresponds to a valid transaction account on the account provider system. The authorizing agent may use the proxy code to locate the appropriate verifying (e.g., "validating") information for confirming the transaction account validity. Once the authorizing agent verifies the validity of the transaction account using the proxy code, the authorizing entity (e.g., account issuer or acquirer) may provide authorization to the merchant that a transaction may be completed.

In one exemplary embodiment, the RFID reader may additionally be validated. In this instance, the RFID reader may be provided a RFID reader authentication tag which may be used to validate the reader. During a transaction completion, the RFID reader receives the RFID transaction device proxy code, the reader may provide the transaction device proxy code, and the reader authentication tag to an authorizing agent, such as an acquirer. In similar manner as with the transaction account, the acquirer may then validate that the RFID reader is an authorized reader for facilitating a RF transaction with the account issuer. If the RFID reader is validated, the acquirer may then provide the RFID transaction device identifier to an account provider for RFID device verification. The account issuer may then verify that the RFID transaction device is authorized to complete the requested transaction. Alternatively, the reader may be directly validated by the account issuer.

These features and other advantages of the system and method, as well as the structure and operation of various exemplary embodiments of the system and method, are described below.

BRIEF DESCRIPTION OF DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1:
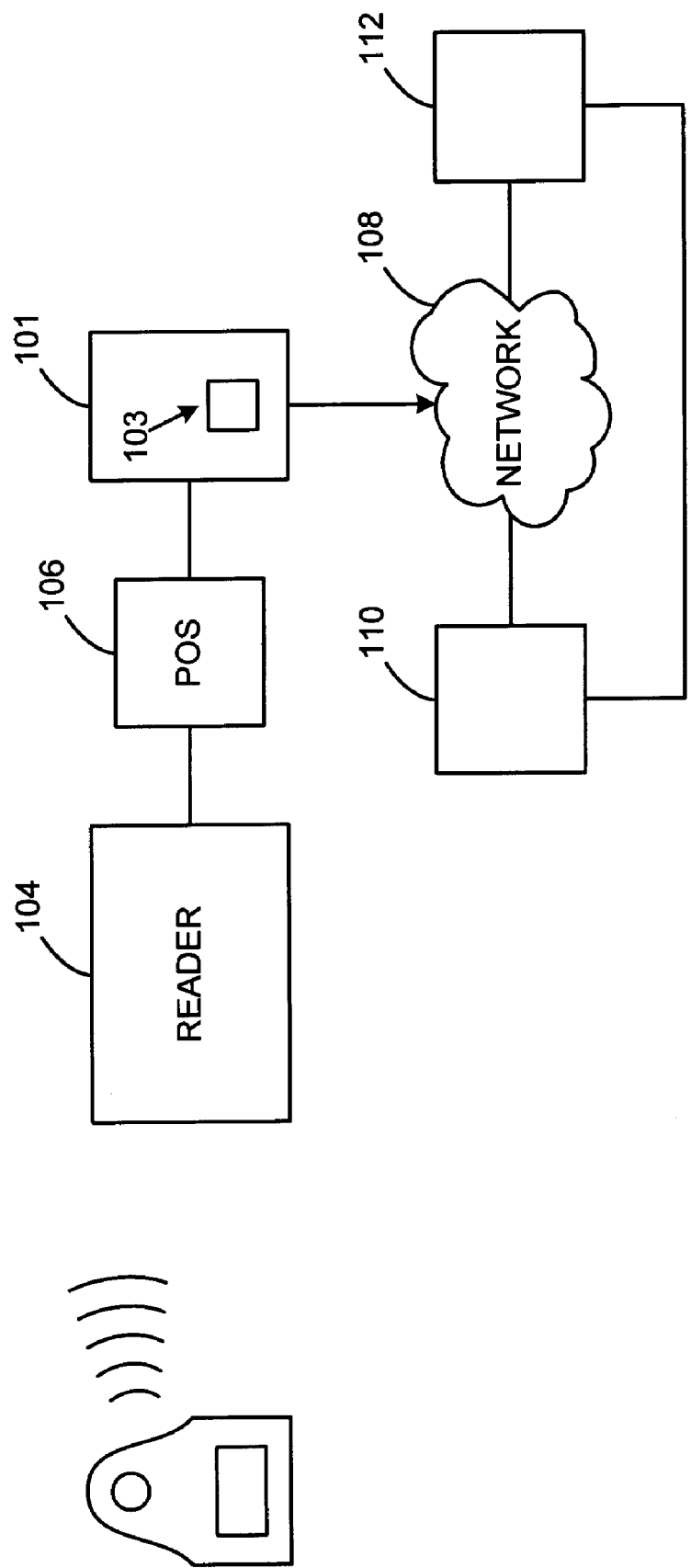
FIG. 1 illustrates an exemplary RFID transaction system depicting exemplary components for use in a secure RFID transaction completed in accordance with the present invention.

The present invention may be described herein in terms of functional block components, screen shots, optional selections and various processing steps. Such functional blocks may be realized by any number of hardware and/or software components configured to perform the specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, encryption and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN). Further still, the terms "Internet" or "network" may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, Dilip Naik, "Internet Standards and Protocols" (1998); "Java 2 Complete", various authors, (Sybex 1999); Deborah Ray and Eric Ray, "Mastering HTML 4.0" (1997); Loshin, "TCP/IP Clearly Explained" (1997). All of these texts are hereby incorporated by reference.

By communicating, a signal may travel to/from one component to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system via any input device such as, a keypad, keyboard, mouse, biometric device, kiosk, personal digital assistant, handheld computer (e.g., Palm Pilot®, Blueberry®), cellular phone and/or the like. Similarly, the invention could be used in conjunction with any type of personal computer, network computer, work station, minicomputer, mainframe, or the like, running any operating system such as any version of Windows, Windows NT, Windows 2000, Windows 98, Windows 95, MacOS, OS/2, BeOS, Linux, UNIX, Solaris, or the like. Moreover, it should be understood that the invention could be implemented using TCP/IP communications protocol, SNA, IPX, Appletalk, IPte, NetBIOS, OSI or any number of communications protocols. Moreover, the transactions discussed herein may include or result in the use, sale, or distribution of any goods, services or information over any network having similar functionality described herein.

A variety of conventional communications media and protocols may be used for data links providing physical connections between the various system components. For example, the data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system including a merchant point of sale (POS) device and host network may reside on a local area network, which interfaces to a remote network for remote authorization of an intended transaction. The POS may communicate with the remote network via a leased line, such as a T1, D3 line, or the like. Such communications lines are described in a variety of texts, such as, "Understanding Data Communications," by Gilbert Held, which is incorporated herein by reference.

A transaction device identifier, as used herein, may include any identifier for a transaction device, such as, for example, any hardware, software, code, number, letter, symbol, digital certificate, smart chip, digital signal, analog signal, biometric and/or other identifier/indicia. The device identifier may also be correlated to a user transaction account (e.g., credit, charge debit, checking, savings, reward, loyalty, or the like) maintained by a transaction account provider (e.g., payment authorization center). A typical transaction account identifier (e.g., account number) distinct to a transaction device, may be correlated to a credit or debit account, loyalty account, or rewards account maintained and serviced by such entities as American Express®, Visa®, MasterCard® or the like.

A transaction device identifier or account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000." In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number transaction device may be stored as Track 1 and Track 2 data as defined in ISO/IEC 7813, and further may be created unique to the RFID transaction device. The account number or transaction device may be communicated in Track 1 and Track 2 data, as well.

In one exemplary embodiment, the transaction device may be correlated with a unique RFID transaction device account number. In accordance with the invention, the account number is not provided to a merchant during transaction completion. Instead, the merchant system may be provided a "proxy code" (described below). The transaction device proxy code may be stored on a transaction device database located on the transaction device. The transaction device database may be configured to store multiple proxy codes issued to the RFID transaction device user by the same or different account providing institutions.

To facilitate understanding, the present invention may be described with respect to a credit account. However, it should be noted that the invention is not so limited. Other accounts which facilitate an exchange of goods or services are contemplated to be within the scope of the present invention.

The databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

In addition to the above, the transaction device identifier may be associated with any secondary form of identification configured to allow the consumer to interact or communicate with a payment system. For example, the transaction device identifier may be associated with, for example, an authorization/access code, personal identification number (PIN), Internet code, digital certificate, biometric data, and/or other secondary identification data used to verify a transaction device user identity.

It should be further noted that conventional components of RFID transaction devices may not be discussed herein for brevity. For example, one skilled in the art will appreciate that the RFID transaction device and the RFID reader disclosed herein include traditional transponders, antennas, protocol sequence controllers, modulators/demodulators and the like, necessary for proper RFID data transmission. A suitable RFID transaction device and RFID reader which may be used with this invention are disclosed in U.S. patent application Ser. No. 10/192,488, filed Jul. 9, 2002. As such, those components are contemplated to be included in the scope of the invention.

Various components may be described herein in terms of their "validity." In this context, a "valid" component is one that is partially or fully authorized for use in completing a transaction request in accordance with the present invention. Contrarily, an "invalid" component is one that is not partially or fully authorized for transaction completion.

Although the present invention is described with respect to validating a transaction device or reader communicating in a RF transaction, the invention is not so limited. The present invention may be used for any device, machine, or article which provides user identifying data to a merchant. Thus, the present invention may be used in any contact or contactless environment where identifying data is transferred to a merchant.

During a typical RFID transaction, a RFID transaction device user may transmit information concerning the user's transaction account to a merchant POS. The information received by the POS may include, for example, the transaction device identifier or account number. The information may further include personal, demographic, biometric or statistical information related to the transaction device user. Upon receiving the information, the merchant POS ordinarily provides the information to a merchant system. The merchant may store the information in a merchant system database for later reference. For example, the merchant system may then reference the transaction device information in the event that a user wishes to complete a transaction by providing the merchant the same identifying information as the merchant has stored on the merchant system.

In most instances, the transaction device information is stored on the merchant system database for an extended period of time. The extended storage is often because the merchant typically may wish to have the information readily available for later reference (e.g., transaction request maintenance, account or transaction request tracking, or the like). The merchant may also desire to archive the transaction device information for later use in preparing promotional offers or solicitations or materials to be provided to the transaction device user.

One key disadvantage of the conventional transaction processing method described above is that the information stored by the merchant is typically "sensitive information." Sensitive information is that information which the transaction account provider or the transaction device user would want to guard from theft. Sensitive information may be any information or data. The sensitive information may be used to conduct a fraudulent transaction. For example, sensitive information may be the user account number, transaction device identifier, transaction device user personal data or the like. The information may be used for example to complete a transaction by reproducing the sensitive information without authorization. If sensitive information is somehow compromised or stolen, it is easily subjected to fraudulent usage. For example, should an unscrupulous person gain access to the merchant system and steal the transaction device identifier or account number, the person may be able to use the stolen information to place fraudulent charges on the associated transaction account. As such, the merchant may put into place special security measures designed to protect the sensitive information from theft. The merchant ordinarily makes decisions related to securing the sensitive information without consulting the account provider. The transaction account provider often must rely on the effectiveness of the merchant security measures to ensure that the information is not stolen while being stored on the merchant database. If the merchant security methods are ineffective or easily compromised, the sensitive information may be easily stolen.

The present system and method permits the account issuer to control the level of security with which the information stored on the merchant database is protected. An exemplary method in accordance with the present invention is described in FIG. 2. In accordance with the invention, an account provider provides a transaction account to an account user for completing a transaction (step 202). The user may receive the transaction account after the user provides information concerning the user to an account provider system. For example, the user may complete an application for a credit card, and the credit card provider may provide a credit transaction account to the user for transaction completion. The account issuer may then permanently assign a proxy code to the transaction account, so that the proxy code need never be altered or modified during the life of the transaction account (step 204). The account issuer may store the proxy code correlative to the related transaction account. The account issuer may store the proxy code and the account number in a relational database, so that the account issuer could locate the transaction account by referencing the associated permanently assigned proxy code. The account provider may then provide the proxy code to the user, by embodying the proxy code in any presentable form factor such as a credit card, debit card, calling card, loyalty card, key fob, cell phone, key ring, ring, or the like (step 206). The user may then provide the proxy code to a merchant system during the completion of a transaction request (step 208). The manner in which the user provides the transaction account proxy code to the user system may vary in accordance with the form factor in which the proxy is embodied. For example, where the proxy code is embodied in the magnetic stripe of a conventional credit card, the user may provide the proxy code to the merchant by "swiping" the magnetic stripe at a suitable reader as is found in the prior art. Alternatively, the proxy code may be embodied in a transponder system associated with a key fob. In this instance the user may provide the account number to the merchant system by waiving the key fob in proximity to a suitable transponder reader. The reader may provide an interrogation signal to the transponder system to facilitate operation of the transponder system and the transponder reader may provide the proxy code to the merchant system for processing. The merchant may receive the proxy code and store the proxy code in a merchant system database for later reference (step 210). For example, where the user requests that the merchant store the proxy code in reference to a recurring billing account for payment, the merchant may store the proxy code relative to the recurring billing account and periodically use the proxy code to seek payment. The merchant system may then provide the proxy code to the account issuer in a transaction request, under the merchant defined business as usual standard to facilitate completing the transaction (step 212). The account issuer may receive the proxy code and match the proxy code to the corresponding transaction account, which may be stored on a merchant database (step 214). The account provider may then provide to the merchant the information, or funds to complete the transaction (216).

As used herein, the term "proxy code" may include any device, hardware, software, code, number, letter, symbol, digital certificate, smart chip, digital signal, analog signal, biometric and/or other identifier/indicia. The proxy code may also refer to any information provided to, for example, a merchant system during completion of a transaction request, which partially or fully masks the underlying sensitive information from the merchant system. As such, the information provided "masks" the underlying sensitive information related to the transaction account from the merchant system. Particularly, the information provided to the merchant (called "proxy code", herein) does not include sensitive information like, for example, the transaction account number. Consequently, the merchant system is never provided the sensitive information since the sensitive information is not included in the proxy code. Moreover, the proxy code may take the form of any conventional transaction account identifier. As such, when the merchant receives the proxy code, the merchant system may process the proxy code under business as usual standards. For example, the proxy code may take the form of any conventional transaction device identifier or account number. The merchant system thereby stores the proxy code in the place of the information ordinarily stored under conventional processing methods. Since the proxy code does not include sensitive information, no sensitive information may be stolen should the merchant system be compromised. In this way, the account issuer may substantially eliminate, minimize or control the risks associated with the security of the merchant system being compromised (e.g., fraud transactions, identity theft, etc.).

Another advantage of the present invention is that since the proxy code is permanently associated to a transaction account, the proxy code need never be modified in the merchant system. As such, the present invention eliminates the need to update information on the merchant system every time the related transaction device is lost, stolen, or replaced. More particularly, the replacement device is provided the identical proxy code as was provided to the original transaction device. Consequently, the merchant is provided the identical proxy code in any instance where the user wishes to complete a transaction using the transaction account which the account provider has permanently associated with the proxy code.

For example, the merchant may receive the proxy code and store the proxy code related to a recurring billing account such as a telephone account. Periodically the merchant may bill a transaction device user in accordance with the telephone services provided. The device user may wish to provide the merchant with transaction device information the merchant may use to satisfy the bill. The user may authorize the merchant to store the device information for repeated use in satisfying the bill. In a conventional recurring billing environment, the device information must ordinarily be updated when the user loses the device or the device information expires. That is, the replacement device often is given device information which is often different from the information contained on the original transaction device. However, in accordance with the present invention, the merchant need not update transaction device information because the proxy code is permanently associated with the transaction account.

FIG. 1 illustrates an exemplary RFID transaction system 100 in accordance with the present invention, wherein exemplary components for use in completing a RF transaction are depicted. In general, system 100 may include a RFID transaction device 102 in RF communication with a RFID reader 104 for transmitting data therebetween. The RFID reader 104 may be in further communication with a merchant point of sale (POS 106) device 106 for providing to the POS 106 information received from the RFID transaction device 102. The POS 106 may be in further communication with a merchant system 101, which may include a merchant database 103. Merchant system 101 may be in communication with an acquirer 110 or an account issuer 112 via a network 108 for transmitting transaction request data and receiving authorization concerning transaction completion.

Although the POS 106 is described herein with respect to a merchant point of sale (POS) device, the invention is not to be so limited. Indeed, a merchant POS device is used herein by way of example, and the point of sale device may be any device capable of receiving transaction device account information from the transaction device 102. In this regard, the POS 106 may be any point of interaction device, such as, for example, a merchant terminal, kiosk, user terminal, computer terminal, input/output receiver or reader, etc., enabling the user to complete a transaction using a transaction device 102. The POS device 106 may receive RFID transaction device 102 information and provide the information to a merchant system 101 for processing.

As used herein, an "acquirer" may be any databases and processors (e.g., operated by a third party) for facilitating the routing of a payment request to an appropriate account issuer 112. The acquirer 110 may route the payment request to the account issuer 112 in accordance with a routing number, wherein the routing number corresponds to the account issuer 112. The routing number may be provided by the RFID transaction device 102. The "routing number" in this context may be a unique network address or any similar device for locating an account issuer 112 on a network 108. In one exemplary embodiment, the routing number may typically be stored on one of the "tracks" comprising a magnetic stripe network. For example, the proxy code may be provided in traditional ISO magnetic stripe format. The routing number may be typically stored in Track 1/Track 2 format so that the information may be interpreted by the POS device 106 and merchant system 101. Traditional means of routing the payment request in accordance with the routing number are well understood. As such, the process for using a routing number to provide a payment request will not be discussed herein.

In addition, the account issuer 112 (or account provider) may be any entity which provides a transaction account useful for facilitating completion of a transaction request. The transaction account may be any account which maintains credit, debit, loyalty, direct debit, checking, savings, or the like. The term "issuer" or "account provider" may refer to any entity facilitating payment of a transaction using a transaction device, and which may include systems permitting payment using at least one of a preloaded and non-preloaded transaction device 102. Typical issuers may be American Express, MasterCard, Visa, Discover, and the like.

In general, during operation of system 100, the RFID reader 104 may provide an interrogation signal to transaction device 102 for powering the device 102 and receiving transaction device related information. The interrogation signal may be received at the transaction device antenna 120 and may be further provided to a transponder (not shown). In response, the transaction device processor 114 may retrieve transaction device information from transaction device database 116 for providing to the RFID reader 104 to complete a transaction request. Typically, where the transaction device information includes a transaction device identifier or authentication tag, the identifier and tag may be encrypted prior to providing the information to reader 104.

It should be noted that the RFID reader 104 and the RFID transaction device 102 may engage in mutual authentication prior to transferring any transaction device 102 data to the reader 104. For a detailed explanation of a suitable mutual authentication process for use with the invention, see commonly owned U.S. patent application Ser. No. 10/340,352, entitled "System and Method for Incenting Payment Using Radio Frequency Identification in Contact and Contactless Transactions," filed Jan. 10, 2003, incorporated by reference in its entirety.

Once the RFID reader 104 receives the transaction device information, the reader 104 provides the information to the merchant POS 106 which provides the information to the merchant system 101. The merchant system 101 may then append the transaction device information with transaction request data and provide the entire transaction request (i.e., transaction request data and transaction device information) to an acquirer 110 or issuer 112 for transaction completion. The transmitting of the information from the transaction device 102 to the acquirer 110 (or issuer 112) may be accomplished in accordance with any conventional method for completing a transaction using contact and wireless data transmission. The acquirer 110 or the issuer 112 may then determine whether to authorize completion of the transaction request in accordance with any business as usual protocol.

In addition to appending the transaction device information to the transaction request data for transaction authorization, conventional merchant systems may also store the transaction device information in a merchant system database (not shown) for later reference. For example, a particular merchant may want to provide special advertisements to the user of the transaction device 102 based on the user's prior purchases at the merchant location. The merchant system 101 may then recall the transaction device information and use the information to prepare, for example, a repeat customer mailing list. In some cases, however, the merchant system 101 often also stores sensitive information related to the user such as, for example, the user's account number (e.g., credit card number) associated with the transaction device 102. This sort of information is typically very easy to use in fraudulent transactions and therefore must be secured from theft. As such, conventional merchant systems use special security methods to safeguard the sensitive information from theft.

Figure 2:
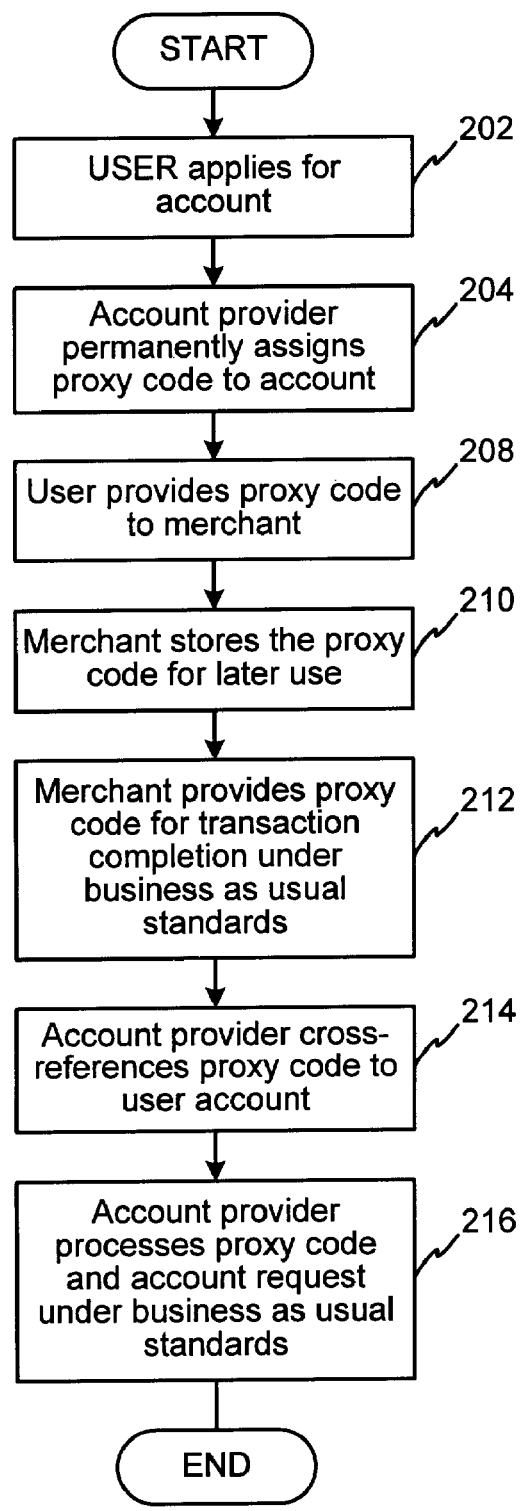
FIG. 2 depicts an exemplary flowchart of an overview of a exemplary method for securing a RFID transaction in accordance with the present invention.

The account issuer 112 may provide additional security by assigning a permanent fixed proxy code to the transaction device transaction account (step 204 of FIG. 2). The proxy code may not itself include sensitive information. The proxy code may be associated with a user's transaction account number on a merchant database 103. The account issuer 112 may then provide the proxy code, and not the transaction account number, to the user in a suitable form factor such as, the RFID transaction device 102 discussed above (step 208). The transaction device 102 user may then provide the proxy code to the merchant system 101 during the completion of transaction (step 208). The merchant system 101 may then process the proxy code as a part of a transaction request and may provide the proxy code and to the account issuer 112 for process under merchant and account issuer business as usual standards (step 212). The merchant system 101 may also store the account proxy code for later reference (step 210). Since the proxy code is permanently assigned to the transaction account, the merchant system never need to modify the proxy code on the merchant system 101. The merchant system 101 may store the proxy number on merchant database 103 using any method the merchant ordinarily uses to store customer data.

In assigning the proxy code, the issuer system 112 may first permit a transaction device 102 user to open a transaction account for use in completing a transaction request (step 202). The user may open a transaction account by providing personal or demographic information and the like to an issuer system 112 which may use the information to assign a transaction account and account number to the user. The transaction account may be identified by the account number in the issuer system 112 database (not shown), and the issuer system 112 may be able to reference the transaction account using the account number when authorizing a transaction (step 214).

In this context, the account number is considered sensitive information. The issuer system 112 may then assign a proxy code to the transaction account (step 220). In assigning the proxy code, the issuer system 112 may correlate or match the proxy code to the account number in, for example, a relational database. The algorithm may be such that it will receive the proxy code and operate on the proxy code to convert the proxy code to a number correlated with the transaction account number. Alternatively, the account issuer 112 may store the proxy code in a one to one relationship with the account number. Further still, the account issuer 112 may use any suitable correlation technique that is known which permits the account issuer system to receive one data and associate it with a second data. In other embodiments, the proxy code may be derived from the account number or any other data field, where the proxy code is store, for example, in data fields on the transaction device 102. Where the proxy code is accompanied by a secondary identifier, such as, for example, a personal identification number (PIN), the issuer system 112 database may correlate or match the proxy code, account number and secondary identifier, so that the issuer system 112 may reference any one of the numbers using any one of the other numbers. The issuer system 112 may use any conventional matching or storage protocol as is found in the art.

In one exemplary embodiment, the issuer system 112 may assign distinct proxy codes for each transaction account the issuer system 112 maintains. In which case, no two transaction accounts would be assigned identical proxy codes. In another exemplary embodiment, the issuer system 112 may assign the same proxy code to a plurality of transaction accounts, to multiple accounts related to the same cardholder, to multiple accounts controlled by the same entity (e.g., corporate card accounts), to all the transaction accounts the issuer system 112 maintains or any other subset of accounts. Moreover, a proxy code may not be a separate code; rather, the proxy code may be derived from the transaction device identifier or any other data. In another embodiment, the proxy code may be contained within another code or account number. In another embodiment, the proxy code is an encrypted or manipulated account number (or any other sensitive information). The same proxy code, an amended proxy code or an additional proxy code may also represent other sensitive data (aside from the account number), such as, for example, account holder name, address, biometric information, demographic information and/or the like. In this regard, the merchant system will not have access to this information, but the proxy code related to this information will be sent to the acquirer when the acquirer requires any portion of this information as part of its approval process.

The proxy code is then loaded onto the transaction device. In other embodiments, the device may generate its own proxy code. In this embodiment, the user may download the generated proxy code to the issuer (e.g., via the Internet) prior to using the code in a transaction. In another embodiment, the reader, POS or merchant system may generate a proxy code prior to, during or after receiving sensitive information. In this embodiment, the reader may delete the sensitive information, and only transmit the proxy code to complete the transaction.

While the transaction device may only contain the proxy code, in certain embodiments, the transaction device may also contain the account number and other sensitive data; however, the transaction device will only communicate the proxy code to the reader. In one exemplary embodiment, the proxy code is configured in magnetic stripe format. That is, the proxy code may be stored in the Track 1/Track 2 portions of the magnetic stripe track network. The proxy code may be uploaded onto a transaction device 102 which the account issuer 112 has assigned to a user (step 230). The proxy code may be uploaded into the transaction device database in magnetic stripe format, and may also be transmitted to the merchant system 101 in similar magnetic stripe format. A suitable method for providing the proxy code to the transaction device 102 may be determined by the transaction device 102 configuration. For example, conventional methods and magnetic stripe read/write devices may be used to encode the proxy code in one location on one of the magnetic stripe tracks. Alternatively, the proxy code may be uploaded into a database or other storage area contained on the transaction device 102, by populating the proxy code on the database using any convention method. A suitable method is described in commonly owned U.S. patent application Ser. No. 10/192,488, entitled "SYSTEM AND METHOD FOR RFID PAYMENT USING RADIO FREQUENCY IDENTIFICATION IN CONTACT AND CONTACTLESS TRANSACTIONS," incorporated herein by reference. Once the proxy code is uploaded into the transaction account database, the transaction device 102 may be used for transaction completion (step 208).

In this embodiment, the transaction account may also be assigned a secondary form of identification which may be encrypted, and which may not be available to the merchant system 101. The secondary form of identification may be correlated to the transaction account on the issuer system 112 so that the issuer system 112 may later reference the transaction account for transaction completion.

Once the proxy code is assigned and loaded on the transaction device, the proxy code may be provided during the execution of a transaction in lieu of the actual transaction account number. In this way, the proxy code masks the actual account number from the merchant system 101 and from potential theft. Thus, instead of the merchant system 101 storing the account number for later reference, the merchant system 101 stores the proxy code.

As noted, in one exemplary embodiment, the proxy code is formatted to mimic conventional transaction device sensitive information, such as an account number. Because the proxy code mimics an account number or any other sensitive data and is configured in a format recognizable to the merchant system 101, the merchant system 101 is unable to distinguish between the proxy code and the actual account number. For example, where the actual account number is a credit card number, the proxy code would be configured to take the form of a valid credit card number. Similarly, where the actual account number is a loyalty number, the proxy code is configured in a format similar to a valid loyalty number. In either case, however, the proxy code may contain no or minimal sensitive information related to the user account.

As shown, a secure RFID transaction in accordance with this embodiment may begin when the RFID device 102 enters the interrogation zone of the RFID reader 104 and is interrogated, such as when the transaction device 102 is used to complete a transaction request (step 208). The transaction device 102 information, including the proxy code, device 102 encrypted identifier (where included), and the account issuer 112 routing number, may then be provided to the device processor 114 for transmitting to the RFID reader 104 via RF transmission.

The RFID reader 104 may receive the transaction device 102 information, including the proxy code, and if necessary, convert the information into a POS recognizable format. The converted information may then be provided to the merchant system 101 via POS 106. The merchant system 101 may receive the transaction device information and combine the information with information concerning the requested transaction to produce a transaction request. The transaction information may include a product or merchant location identifier, as well as the terms for satisfying the transaction (e.g., price to be paid, barter points to be traded, loyalty points to be redeemed). Because the proxy code is in the same format as the account number or other sensitive data, the merchant system recognizes the information as valid data for the respective field. The merchant system may then provide the transaction request to an acquirer 110 via a network 108 for transaction request completion.

The acquirer 110 may, in turn, provide the transaction request to the appropriate account issuer 112 for processing (step 212). The acquirer 110 may identify the appropriate account issuer 112 using the routing number provided by the transaction device 102 to locate the network address corresponding to the account issuer 112, thereby permitting the acquirer 110 to provide the transaction request to the account issuer 112 maintaining the corresponding transaction device account.

The account issuer 112 may receive the transaction request and process the transaction request in accordance with the issuer system defined protocol.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. In addition, the steps recited in any of the method or process claims may be executed in any order and are not limited to the order presented or method steps may be added or eliminated as desired. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:

1. A system for completing a transaction using a transaction device comprising:
    a transaction device associated with a transaction account and a transaction account identifier identifying the transaction account, said transaction device including a transaction device database for storing said transaction account identifier;
    a transaction device reader system in communication with said transaction device and configured to receive the transaction account identifier from said transaction device, wherein, after receiving said transaction account identifier, said transaction device reader system generates a transaction device proxy code, deletes the transaction account identifier, and does not communicate the transaction account identifier for use in further transaction processing; and
    a transaction device account issuer system configured to:
        maintain the transaction account associated with the transaction device,
        receive the transaction device proxy code,
        correlate the transaction device proxy code with the transaction account, and
        process the transaction using the transaction account.

2. A system according to claim 1, further comprising a merchant system in communication said transaction device account issuer system, said merchant system including a merchant system database and said transaction device reader system, wherein said transaction device reader system is a point of interaction (POI) device in communication with said transaction device for transmitting and receiving data from said transaction device in a contactless environment, the POI being in RF communication with said transaction device.

3. A system according to claim 2, said merchant system associating said transaction device proxy code to a transaction request.

4. A system according to claim 3, wherein said merchant system provides at least said transaction device proxy code and said transaction request to said issuer system.

5. A system according to claim 4, wherein said transaction device account issuer system correlates said transaction device proxy code to said transaction account identifier and then to said transaction account, said transaction device account issuer system satisfying said transaction request relative to said transaction account.

6. A system according to claim 5, wherein said transaction account identifier is encrypted prior to providing said transaction account identifier to said merchant system.

7. A system according to claim 6, wherein said transaction device proxy code is decrypted by said transaction device account issuer system prior to said transaction device account issuer system correlating said transaction device proxy code to said transaction account.

8. A system according to claim 7, wherein said proxy code is unique to said transaction account.

9. A system according to claim 7, wherein said transaction device proxy code is unique to said transaction device account issuer system.

10. A method for completing a transaction in a contactless environment said method including:
    providing a transaction account identifier to a radio frequency identification (RFID) transaction device;
    transmitting said transaction account identifier from said RFID transaction device to a transaction device reader system;
    receiving, at the transaction device reader system, the transaction account identifier, wherein after receiving the transaction account identifier, the transaction device reader system generates a transaction device proxy code, deletes the transaction account identifier, and does not communicate the transaction account identifier for use in further transaction processing;
    receiving said transaction device proxy code at a transaction device issuer system, said transaction device issuer system maintaining a transaction account correlative to the transaction account identifier, wherein said transaction device issuer system correlates the transaction device proxy code with the transaction account; and
    facilitating the completion of a transaction request correlative to the transaction account.

11. A method according to claim 10, further including correlating the proxy code to a distinct transaction device.

12. A method according to claim 10, further including correlating the proxy code to a distinct transaction account issuer system.

* * * * *